June 8, 1943.   J. GASKELL   2,321,480
TANK FOR MOLTEN GLASS
Filed Sept. 12, 1939   2 Sheets-Sheet 1

Joseph Gaskell, INVENTOR
By Morrison, Kennedy & Campbell,
Attorneys.

June 8, 1943.   J. GASKELL   2,321,480
TANK FOR MOLTEN GLASS
Filed Sept. 12, 1939   2 Sheets-Sheet 2
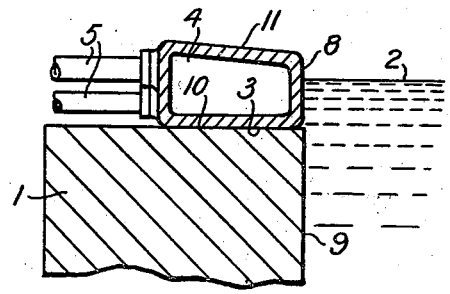
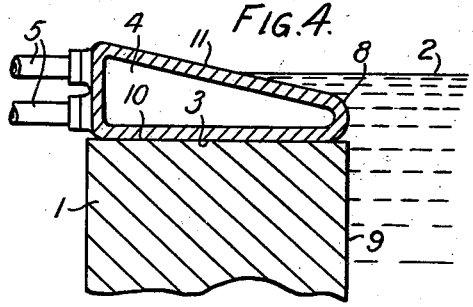
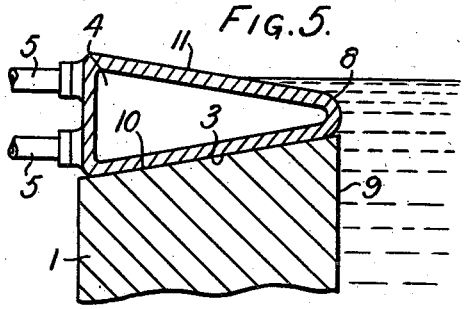
Joseph Gaskell, INVENTOR,
By Morrison, Kennedy & Campbell,
Attorneys.

Patented June 8, 1943

2,321,480

UNITED STATES PATENT OFFICE 2,321,480

TANK FOR MOLTEN GLASS

Joseph Gaskell, Saint Helens, England, assignor to Pilkington Brothers Limited, London, England, a company of Great Britain Application September 12, 1939, Serial No. 294,435
In Great Britain September 17, 1938

2 Claims. (Cl. 49—54)

This invention relates to tank furnaces for molten glass of the kind in which the tanks are constructed with walls composed of blocks made of refractory clay material, and with a roof having springers supported independently of the walls.

The refractory blocks in the wall are attacked by the molten glass, but the attack is far more rapid at the level of the glass, where fluxing materials float on the surface. Once the refractory material has been eaten away at, and just below glass level, the portions of the blocks immediately below the portion eaten away are rapidly eroded.

According to the invention, the upper face of the walls is below the glass level and metal water-cooled boxes rest on the upper face of the walls in intimate contact therewith to provide heat exchange surfaces along at least a part of their length; the inner face of each box being substantially in the plane of the inner face of the top blocks of the wall, and the box extending upwards above the glass level.

Figure 1:
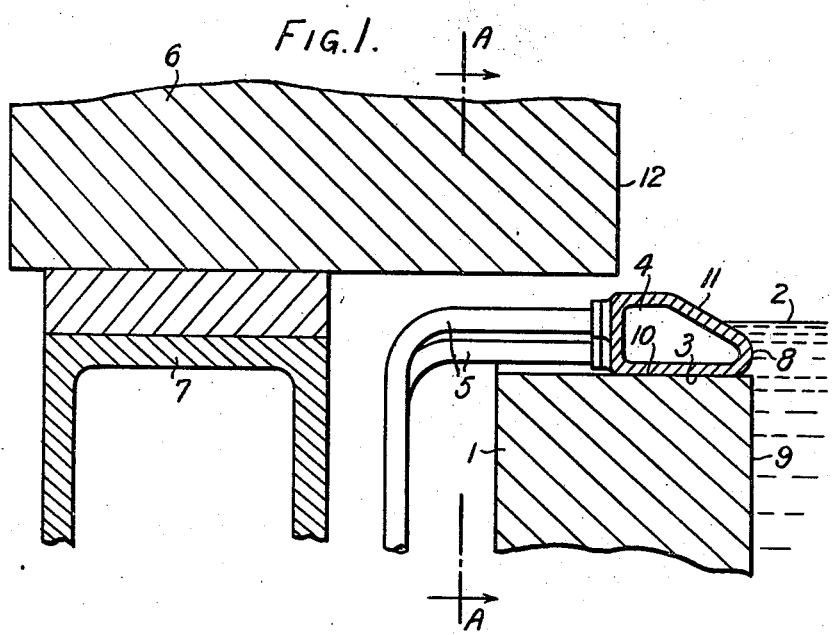
Figure 2:
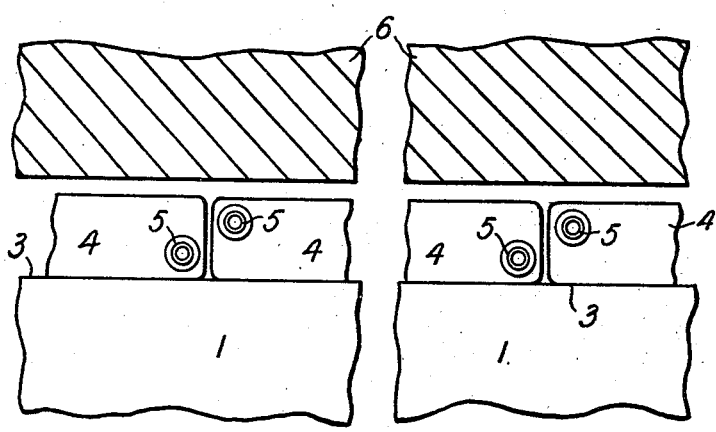

In the accompanying drawings:

Figures 1, 3, 4 and 5 are vertical sections showing the upper part of one wall of a tank and the lower part of the roof springers, and showing alternative forms of water boxes; and Figure 2 is a section along the line A—A of Figure 1.

The upper part of the tank wall is shown at 1, and 2 is the glass level which is above the upper face 3 of the wall. A metal water box 4 rests on the upper face 3 of the wall, extending upwards above the glass level 2. It is cooled by water circulation through the pipes 5. The springer 6 of the roof is supported independently of the wall 1 by box girders 7.

The water box 4 has its inner face 8 in the plane of the inner face 9 of the top block of the wall. Its under surface 10 is flat and rests on the upper face 3 of the wall, and thereby cools the corner of the wall between the faces 3 and 9, and enables the corner to resist better the attack of the refractory material by the glass. In Figure 1, the inner portion of the upper face of the water box is inclined downwardly and inwardly, as at 11, and the glass level 2 is in contact with this inclined face. The fluxing materials which float on the surface of the glass, and are especially active in attacking refractory material, are in contact with the face 11 of the water box and not with the refractory material of the wall 1.

Applicants have found that wall blocks surmounted by water boxes such as 4 wear away almost uniformly down the face of the block, and very slowly, the wear at the upper part of the top block being about one-eighth of the wear of blocks in a wall as usually constructed.

In Figure 3, the inner face 8 of the water box 4 is vertical, and the glass level is at this vertical face. In Figure 4, the water box 4 extends back the full width of the wall, thus giving more effective cooling to the top block of the wall, and in Figure 5, the top of the wall is inclined downwardly and outwardly, so as to give a larger water space in the box, without increasing the inclination of the upper face 11.

The upper face 11 of the water box is inclined as shown, so as to facilitate the escape of any steam which may be formed and to prevent the formation of any air pocket. For the same reason the upper pipe 5 is made the outlet pipe, and is placed so as to take water from the highest point of the water box.

It is, in general, not necessary to construct the whole wall of the tank with superimposed water boxes, but only those lengths of the wall which are ordinarily subject to wear. A given length of wall may be surmounted by a single long water box or by a plurality of boxes placed end to end, as shown in Figure 2.

The inner face 12 of the roof springer 6 is preferably in a plane outside the line of contact between glass and water box, as shown in Figure 1 so that the salt-laden vapours which condense on the face 12 and drip off it, fall on the boxes and are prevented either from entering the glass or from falling on the refractory blocks.

The water boxes should extend inwardly at least as far as the inner corner of the wall, in order to protect this corner effectively, and it is preferable that they should not extend inwardly beyond the face 9 by any substantial amount.

Water boxes constructed as shown can be placed in position after construction of the tank, and a defective water box can be replaced.

Having described my invention, I declare that what I claim and desire to secure by Letters Patent is:

1. A tank furnace for molten glass comprising walls composed of monolithic blocks made of refractory clay material with which the glass is in contact and which is subject to erosion by the glass, and a roof having springers supported independently of the walls, said refractory blocks extending upwards to a level a little below glass level and a plurality of separate erosion resisting water-cooled metal boxes on said wall extending from the upper surface of the blocks to a level a little above glass level, each box having a flat under surface by which it rests on the upper surface of the topmost refractory blocks in intimate contact therewith to provide a heat exchange surface therefor, which surface extends continuously from a line substantially at the inner edge of the said blocks outwards for a distance equal to at least half the width of the said blocks and each box having an upper surface which is inclined inwardly and downwardly at least over the inner portion of its width, whereby the water boxes cool the inner top edges and contiguous upper surfaces of the blocks on which they rest and retard the erosive action of the glass thereon, the form of the boxes being such as to prevent the formation of air pockets therein and to facilitate the escape of steam.

2. A tank furnace for molten glass comprising walls composed of monolithic blocks made of refractory clay material with which the glass is in contact and which is subject to erosion by the glass, and a roof having springers supported independently of the walls, said refractory blocks extending upwards to a level a little below glass level and a plurality of separate erosion resisting water-cooled metal boxes on said wall extending from the upper surface of the blocks to a level a little above glass level, each metal box being wedge shaped in transverse section including a flat under surface adapted to rest on the upper surface of the topmost block in continuous intimate contact therewith, with the narrow end of the wedge substantially in the plane of the inner face of the topmost block, an inclined upper surface and an inner face connecting the flat under surface with the inclined upper surface, said inclined surface being disposed so that the level of the glass in the tank is above the inner face of each box, whereby the water boxes cool the inner top edges and contiguous upper surfaces of the blocks on which they rest and retard the erosive action of the glass thereon.

JOSEPH GASKELL.